(12) United States Patent
Zhu et al.

(10) Patent No.: US 11,132,396 B2
(45) Date of Patent: Sep. 28, 2021

(54) METHODS, SYSTEMS, AND MEDIA FOR DETERMINING AND PRESENTING INFORMATION RELATED TO EMBEDDED SOUND RECORDINGS

(71) Applicant: Google LLC, Mountain View, CA (US)

(72) Inventors: Kevin Song Zhu, San Mateo, CA (US); Lucas Pollock, San Francisco, CA (US); Yingjie He, Sunnyvale, CA (US); Francois-Xavier Nuttall, Zurich (CH); Reuben Kuhnert, San Francisco, CA (US); Patrice Lauriston, San Francisco, CA (US); Siddharth Shankar, Mountain View, CA (US); Harris Cohen, Burlingame, CA (US); David Rosenstein, Burlingame, CA (US); Xin Chen, Sunnyvale, CA (US); Brian Karlak, San Francisco, CA (US); Christian Weitenberner, Venice, CA (US); Girum Ibssa, San Francisco, CA (US); Ullas Gargi, Sunnyvale, CA (US); Krishmin Rai, San Francisco, CA (US); Arthur Vincent Joseph Gaudriot, Queenstown (SG)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/615,331

(22) PCT Filed: Dec. 15, 2017

(86) PCT No.: PCT/US2017/066728
§ 371 (c)(1),
(2) Date: Nov. 20, 2019

(87) PCT Pub. No.: WO2019/117948
PCT Pub. Date: Jun. 20, 2019

(65) Prior Publication Data
US 2020/0175065 A1    Jun. 4, 2020

(51) Int. Cl.
*G06F 16/68* (2019.01)
*H04N 21/233* (2011.01)
(Continued)

(52) U.S. Cl.
CPC ......... *G06F 16/686* (2019.01); *H04N 21/233* (2013.01); *H04N 21/2365* (2013.01); *H04N 21/431* (2013.01); *H04N 21/4722* (2013.01)

(58) Field of Classification Search
None
See application file for complete search history.

(56) References Cited

U.S. PATENT DOCUMENTS

| 7,930,329 B2 | 4/2011 | Lee et al. |
| 8,126,882 B2 | 2/2012 | Lawyer |

(Continued)

FOREIGN PATENT DOCUMENTS

| KR | 10-2009-0107037 | 10/2009 |
| KR | 10-2016-0077764 | 7/2016 |

OTHER PUBLICATIONS

International Search Report and Written Opinion dated Mar. 14, 2018 in International Patent Application No. PCT/US2017/066728.

*Primary Examiner* — Ryan F Pitaro
(74) *Attorney, Agent, or Firm* — Byrne Poh LLP

(57) ABSTRACT

Methods, systems, and media for determining and presenting information related to embedded sound recordings are provided. In some embodiments, the method comprises: identifying, at a video sharing service, a first video content item that includes an embedded sound recording; identifying a composition associated with the embedded sound recording, wherein the embedded sound recording is a particular version of the composition; identifying one or more artists associated with the composition based on a group of metadata associated with the composition, wherein each item of (Continued)

metadata is provided by a content owner that has provided a sound recording associated with the composition to the video sharing service; identifying a second video content item associated with the embedder sound recording based at least in part on the identified one or more artists; receiving, from a user device, a request to present the first video content item on the user device; and, in response to receiving the request, causing the user device to present a user interface for presenting the first video content item in a first portion of the user interface and information related to the embedded sound recording in a second portion of the user interface, wherein the information related to the embedded sound recording includes indications of the one or more artists and a link to the second video content item.

18 Claims, 4 Drawing Sheets

(51) Int. Cl.
*H04N 21/2365* (2011.01)
*H04N 21/431* (2011.01)
*H04N 21/4722* (2011.01)

(56) References Cited

U.S. PATENT DOCUMENTS

| | | | | |
|---|---|---|---|---|
| 8,168,876 | B2* | 5/2012 | Hsieh | G10H 1/06 84/609 |
| 8,699,862 | B1* | 4/2014 | Sharifi | G06F 16/7834 386/338 |
| 8,839,091 | B2 | 9/2014 | Ramamurthy et al. | |
| 9,256,675 | B1* | 2/2016 | Wiegering | G06F 16/24578 |
| 9,262,413 | B2 | 2/2016 | Ciurdar et al. | |
| 9,478,251 | B2 | 10/2016 | Chaudhri et al. | |
| 9,524,715 | B2* | 12/2016 | Herberger | G10L 15/08 |
| 2002/0194260 | A1* | 12/2002 | Headley | G06F 16/64 709/203 |
| 2009/0119589 | A1 | 5/2009 | Rowell et al. | |
| 2009/0144325 | A1* | 6/2009 | Chastagnol | G06F 16/433 |
| 2010/0023328 | A1* | 1/2010 | Griffin, Jr. | G10H 1/00 704/231 |
| 2010/0094897 | A1* | 4/2010 | Sumrall | G06F 16/683 707/769 |
| 2010/0211693 | A1* | 8/2010 | Master | G06F 16/683 709/238 |
| 2011/0213720 | A1 | 9/2011 | Waid et al. | |
| 2012/0124638 | A1* | 5/2012 | King | G06Q 50/00 726/1 |
| 2012/0317240 | A1* | 12/2012 | Wang | G06F 16/95 709/219 |
| 2013/0198632 | A1 | 8/2013 | Hyman | |
| 2013/0343597 | A1* | 12/2013 | Kocks | G06F 16/738 382/100 |
| 2014/0007171 | A1 | 1/2014 | Yang et al. | |
| 2014/0068670 | A1 | 3/2014 | Timmermann et al. | |
| 2014/0172892 | A1* | 6/2014 | Schechter | G06F 16/24 707/758 |
| 2014/0172961 | A1* | 6/2014 | Clemmer | H04N 21/4307 709/203 |
| 2014/0272820 | A1* | 9/2014 | Wride | G09B 5/04 434/157 |
| 2015/0301718 | A1* | 10/2015 | Trollope | G06F 16/632 715/716 |
| 2015/0363156 | A1* | 12/2015 | Cudak | G11B 27/28 700/94 |
| 2017/0024441 | A1* | 1/2017 | Hedgecock | G06F 16/683 |
| 2017/0108997 | A1* | 4/2017 | Kim | G06F 16/972 |
| 2017/0347142 | A1* | 11/2017 | Tang | G06F 16/738 |
| 2017/0351767 | A1* | 12/2017 | Suzuki | G06F 16/686 |
| 2018/0047399 | A1* | 2/2018 | Candebat | G10L 19/018 |
| 2018/0129370 | A1* | 5/2018 | Sessak | G06F 3/165 |
| 2019/0318060 | A1* | 10/2019 | Brenner | H04N 21/8113 |

* cited by examiner

METHODS, SYSTEMS, AND MEDIA FOR DETERMINING AND PRESENTING INFORMATION RELATED TO EMBEDDED SOUND RECORDINGS

TECHNICAL FIELD

The disclosed subject matter relates to methods, systems, and media for determining and presenting information related to embedded sound recordings. More particularly, the disclosed subject matter relates to extracting identity information from each video content item associated with a sound recording, automatically identifying a subset of artist information from the extracted information to associate with the sound recording, validating the subset of artist information, and generate a user interface that includes the subset of artist information.

BACKGROUND

Users frequently view video content items from video sharing services or using social networking services. Often, these video content items include musical content, such as a soundtrack. A user viewing a video content item with a soundtrack may be interested in the songs included in the soundtrack, and may want to, for example, navigate to a music video associated with one of the songs included in the soundtrack. Additionally, artists associated with the musical content may want an acknowledgement of their work to be presented to a user viewing a video that includes their work. However, it can be difficult for a video sharing service to identify information related to embedded songs or other sound recordings. For example, it can be difficult to correctly identify a writer or other artist associated with a song, identify a particular music video associated with the song, etc. In a more particular example, it can be difficult to correctly identify entities associated with a song when a video sharing service receives multiple video content items for the same video content, where the information associated with each video content item is inconsistent and/or conflicting with the information associated with the other received video content items.

Accordingly, it is desirable to provide new methods, systems, and media for determining and presenting information related to embedded sound recordings.

SUMMARY

Methods, systems, and media for determining and presenting information related to embedded sound recordings are provided.

In accordance with some embodiments of the disclosed subject matter, a method for providing information related to embedded sound recordings is provided, the method comprising: identifying, at a video sharing service, a first video content item that includes an embedded sound recording; identifying a composition associated with the embedded sound recording, wherein the embedded sound recording is a particular version of the composition; identifying one or more artists associated with the composition based on a group of metadata associated with the composition, wherein each item of metadata is provided by a content owner that has provided a sound recording associated with the composition to the video sharing service; identifying a second video content item associated with the embedder sound recording based at least in part on the identified one or more artists; receiving, from a user device, a request to present the first video content item on the user device; and, in response to receiving the request, causing the user device to present a user interface for presenting the first video content item in a first portion of the user interface and information related to the embedded sound recording in a second portion of the user interface, wherein the information related to the embedded sound recording includes indications of the one or more artists and a link to the second video content item.

In some embodiments, the composition associated with the embedded sound recording is identified based on an audio fingerprint associated with the embedded sound recording.

In some embodiments, identifying the one or more artists based on the group of metadata comprises identifying one or more artists that occur most frequently in the group of metadata.

In some embodiments, identifying the one or more artists based on the group of metadata comprises identifying metadata in the group of metadata that include a full name for each artist in the one or more artists.

In some embodiments, the method further comprises identifying a stage name for at least one artist of the one or more artists, wherein the indications of the one or more artists included in the user interface includes the stage name.

In some embodiments, the method further comprises formatting an artist name for each artist in the one or more artists to a common format.

In accordance with some embodiments of the disclosed subject matter, a system for providing information related to embedded sound recordings is provided, the system comprising a memory and a hardware processor that, when executing computer-executable instructions stored in the memory, is configured to: identify, at a video sharing service, a first video content item that includes an embedded sound recording; identify a composition associated with the embedded sound recording, wherein the embedded sound recording is a particular version of the composition; identify one or more artists associated with the composition based on a group of metadata associated with the composition, wherein each item of metadata is provided by a content owner that has provided a sound recording associated with the composition to the video sharing service; identify a second video content item associated with the embedder sound recording based at least in part on the identified one or more artists; receive, from a user device, a request to present the first video content item on the user device; and, in response to receiving the request, cause the user device to present a user interface for presenting the first video content item in a first portion of the user interface and information related to the embedded sound recording in a second portion of the user interface, wherein the information related to the embedded sound recording includes indications of the one or more artists and a link to the second video content item.

In accordance with some embodiments of the disclosed subject matter, a non-transitory computer-readable medium containing computer-executable instructions that, when executed by a processor, cause the processor to perform a method for providing information related to embedded sound recordings is provided, the method comprising: identifying, at a video sharing service, a first video content item that includes an embedded sound recording; identifying a composition associated with the embedded sound recording, wherein the embedded sound recording is a particular version of the composition; identifying one or more artists associated with the composition based on a group of metadata associated with the composition, wherein each item of metadata is provided by a content owner that has provided a sound recording associated with the composition to the video sharing service; identifying a second video content item associated with the embedder sound recording based at least in part on the identified one or more artists; receiving, from a user device, a request to present the first video content item on the user device; and, in response to receiving the request, causing the user device to present a user interface for presenting the first video content item in a first portion of the user interface and information related to the embedded sound recording in a second portion of the user interface, wherein the information related to the embedded sound recording includes indications of the one or more artists and a link to the second video content item.

In accordance with some embodiments of the disclosed subject matter, a system for providing information related to embedded sound recordings is provided, the system comprising: means for identifying, at a video sharing service, a first video content item that includes an embedded sound recording; means for identifying a composition associated with the embedded sound recording, wherein the embedded sound recording is a particular version of the composition; means for identifying one or more artists associated with the composition based on a group of metadata associated with the composition, wherein each item of metadata is provided by a content owner that has provided a sound recording associated with the composition to the video sharing service; means for identifying a second video content item associated with the embedder sound recording based at least in part on the identified one or more artists; means for receiving, from a user device, a request to present the first video content item on the user device; and means for causing the user device to present a user interface for presenting the first video content item in a first portion of the user interface and information related to the embedded sound recording in a second portion of the user interface in response to receiving the request, wherein the information related to the embedded sound recording includes indications of the one or more artists and a link to the second video content item.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
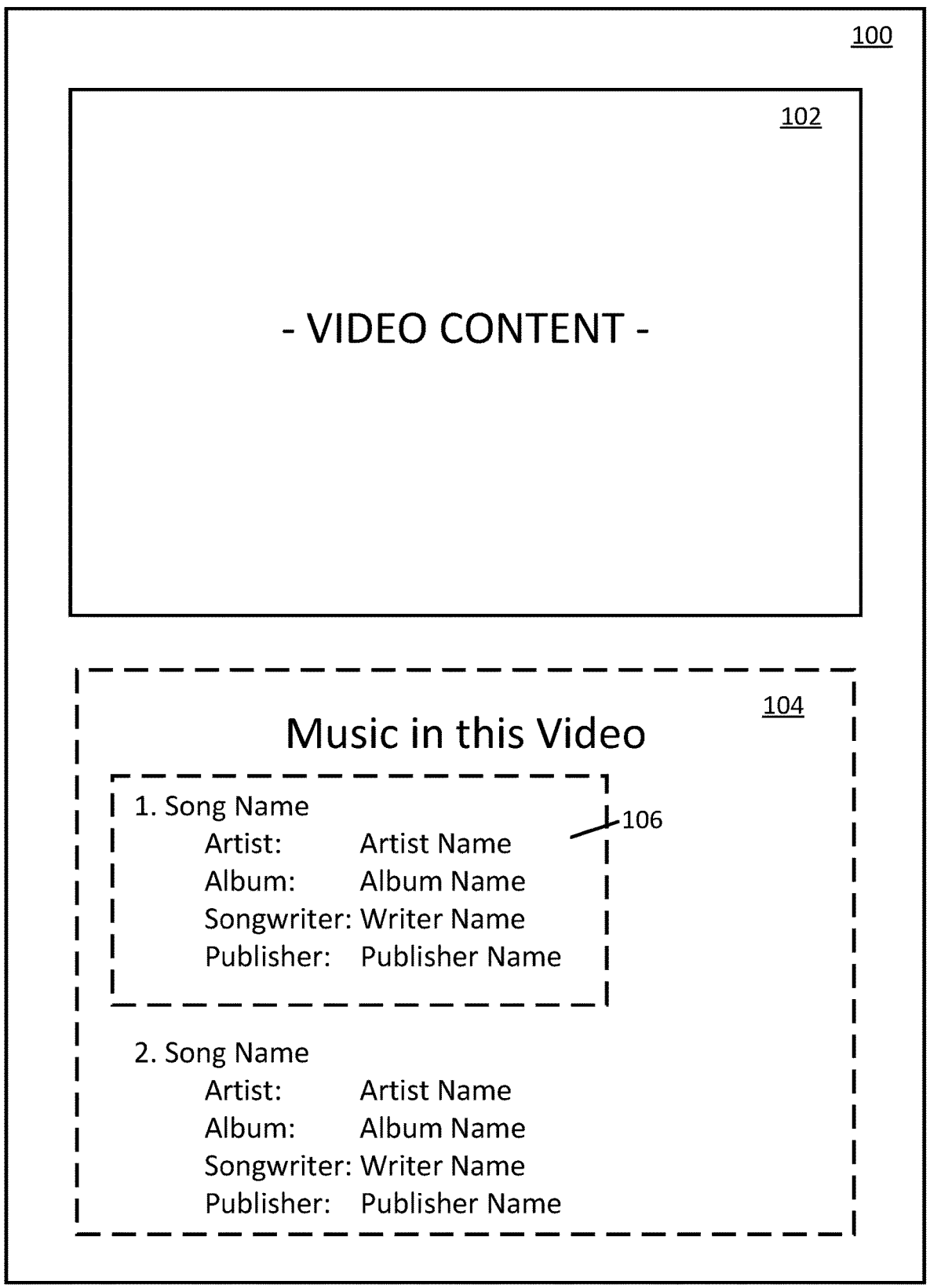
FIG. 1 shows an example of a user interface for presenting information about one or more sound recordings embedded in a video in accordance with some embodiments of the disclosed subject matter.

In accordance with various embodiments, mechanisms (which can include methods, systems, and media) for determining and presenting information related to embedded sound recordings are provided.

In some embodiments, the mechanisms described herein can identify song information and/or artist information associated with a sound recording embedded in a video content item. For example, in some embodiments, the sound recording can be a song included in a soundtrack of a television show, a movie, a video, and/or any other suitable video content item. As another example, in some embodiments, the sound recording can be a song included in a compilation of music videos. In some embodiments, the mechanisms can identify song information associated with the sound recording (e.g., a name of a composition, a particular recording of the composition, and/or any other suitable information) and/or artist information associated with the sound recording (e.g., names of songwriters associated with a particular song, names of singers associated with a particular composition and/or a particular recording of a particular composition, and/or any other suitable artist information). In some embodiments, the mechanisms can then cause the song information and/or the artist information to be presented in a user interface presented on a user device in connection with presentation of the video content item within the user interface. For example, in some embodiments, the user interface can include a video content item presented in a first portion of the user interface and song information and/or artist information indicating songs/artists associated with a soundtrack of the video content item in a second portion of the user interface.

In some embodiments, the song information and/or the artist information presented in the user interface can be hyperlinked in any suitable manner. For example, in some embodiments, a name of a song included in a soundtrack of the video content item can be hyperlinked such that, in response to a link associated with the name of the song being selected within the user interface, a second video content item associated with the song can be presented.

In some embodiments, the song information and/or the artist information can be identified in any suitable manner. For example, in some embodiments, a particular sound recording can be identified as embedded within a video content item based on any suitable audio fingerprinting technique(s). As another example, in some embodiments, the mechanisms described herein can retrieve and/or extract metadata indicating artists associated with the identified sound recording and/or a composition associated with the identified sound recording. As a more particular example, in some embodiments, the metadata can be retrieved from information submitted by multiple content owners that have uploaded versions of the identified sound recording and/or the identified composition to a video sharing service providing the video content item. In some such embodiments, the mechanisms described herein can process and analyze the metadata in any suitable manner. For example, in some embodiments, the mechanisms can format artist names in a standard format, identify stage names associated with one or more of the artists, and/or analyze the metadata in any other suitable manner, as described below in more detail in connection with FIG. 4.

Turning to FIG. 1, an example 100 of a user interface for presenting information related to sound recordings embedded in a video content item is shown in accordance with some embodiments of the disclosed subject matter. In some embodiments, user interface 100 can be presented on a user device that is presenting a video content item, such as a mobile phone, a tablet computer, a desktop computer, a laptop computer, a smart television, and/or any other suitable type of user device. As illustrated, user interface 100 can include a video content item 102, and a panel of sound recording information 104.

In some embodiments, video content item 102 can be any suitable type of video content item, such as a compilation of music videos, a video that includes a soundtrack, a television show that includes a soundtrack, a movie that includes a soundtrack, and/or any other suitable type of video content. In some embodiments, video content item 102 can be a video content item that was requested on a user device presenting user interface 100, for example, from a page associated with a video sharing service listing and/or suggesting available videos.

In some embodiments, panel 104 can include any suitable information. For example, as shown in FIG. 1, panel 104 can include information about songs included in video content item 102. As a more particular example, as shown in FIG. 1, panel 104 can include song information 106, which can indicate a name of a song, an artist associated with the song (e.g., a name of a songwriter, a name of a singer, a name of a music group, and/or any other suitable artist), a publisher of the song, an album associated with the song, and/or any other suitable information. In some embodiments, any suitable information indicated in song information 106 can be hyperlinked. For example, in some embodiments, a name of a song can include a link to any suitable content, such as a music video associated with the song, an information page associated with the song (e.g., indicating popularity trends of the song, and/or any other suitable information), and/or any other suitable information. As another example, in some embodiments, an artist and/or a writer name can include a link to a page associated with the artist and/or the writer (e.g., a page that indicates other musical work associated with the artist and/or the writer, and/or any other suitable page). Note that, although two songs are indicated in panel 104 of FIG. 1, in some embodiments, any suitable number (e.g., one, five, ten, and/or any other suitable number) can be included.

In some embodiments, as described hereinbelow, a portion of the verified artist identification information (e.g., included in a majority of like media items representing the same sound recording) can be presented with hyperlinks associated with the verified artist identification information or any other suitable interface elements. For example, in response to verifying the identity of a publisher corresponding to a sound recording, panel 104 can include a link corresponding to the publisher that, when selected, directs the user device to a page that includes supplemental information relating to the publisher, such as publisher bibliographic information, other sound recordings associated with the publisher, etc. Additionally, in some embodiments, unverified artist identification information can be presented, for example, without hyperlinks. For example, in response to being unable to verify the identity of a publisher corresponding to a sound recording, panel 104 can continue to present the identity of a publisher having the highest probability of being the publisher based on the information extracted from like media items and can inhibit the presentation of a link corresponding to the publisher.

In some embodiments, panel 104 can be presented in an interface separate from user interface 100 in which video content item 102 is being presented. For example, a portion of the information about songs included in video content item 102 can be presented in panel 104 and, in response to selecting a "Show More" interface element positioned within panel 104, additional information about songs included in video content item 102 can be presented in a subsequent user interface. In another example, general information relating to video content item 102 can be presented in panel 104 and, in response to selecting a "Show More" interface element positioned within panel 104, information about songs included in video content item 102 including a song title, a music artist, an album title, and licensing information associated with each song can be presented in a subsequent user interface. In continuing this example, the subsequent user interface can provide the user with an opportunity to access additional information relating to a particular song—e.g., other songs associated with a particular music artist, other songs included in an album having the presented album title, other media content associated with a presented collection society.

In some embodiments, user interface 100 can include any other suitable information or content. For example, in some embodiments, user interface 100 can include information related to a video sharing service that is providing video content item 102 and/or information included in panel 104. As a more particular example, in some embodiments, user interface 100 can include information about purchasing additional services associated with the video sharing service, such as an ability to view video content without advertisements, and/or any other suitable services. As another example, in some embodiments, user interface 100 can include links that allow a user of user interface 100 to include songs included in panel 104 in a playlist of content the user has generated using the video sharing service.

Figure 2:
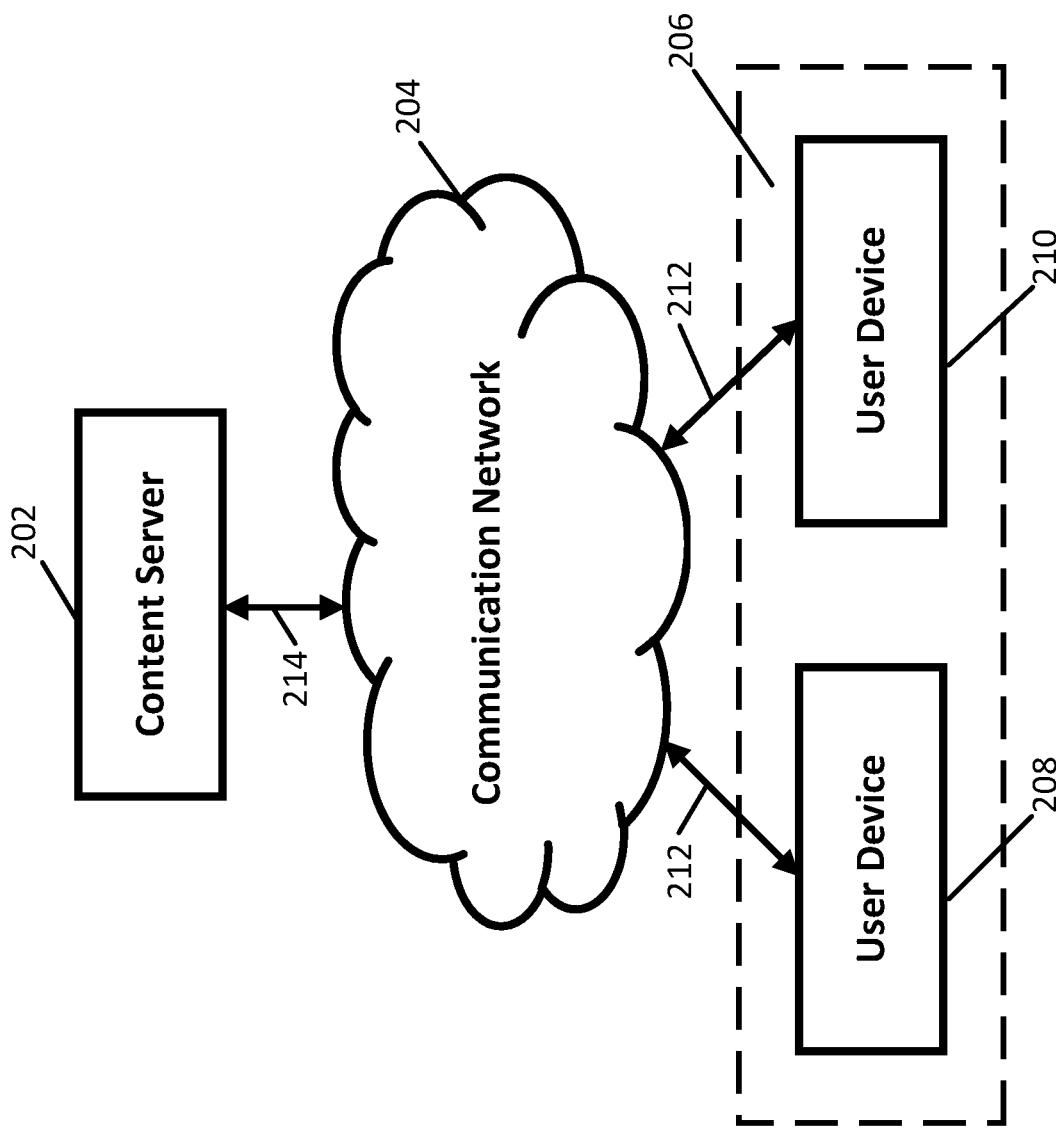
FIG. 2 shows a schematic diagram of an illustrative system suitable for implementation of mechanisms described herein for determining and presenting information related to embedded sound recordings in accordance with some embodiments of the disclosed subject matter.

Turning to FIG. 2, an example 200 of hardware for providing information related to embedded sound recordings that can be used in accordance with some embodiments of the disclosed subject matter is shown. As illustrated, hardware 200 can include a content server 202, a communication network 204, and/or one or more user devices 206, such as user devices 208 and 210.

Content server 202 can be any suitable server(s) for storing and/or providing media content to user devices 206. For example, in some embodiments, content server 202 can store media content, such as videos, television programs, movies, live-streamed media content, audio content, animations, video game content, graphics, and/or any other suitable media content. In some embodiments, content server 202 can transmit media content to user devices 206, for example, via communication network 204. In some embodiments, content server 202 can determine information related to a sound recording (e.g., a song in a soundtrack, and/or any other suitable sound recording) embedded in video content items stored on content server 202, as shown in and described below in connection with FIG. 4.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links (e.g., communications links 212) to communication network 204 that can be linked via one or more communications links (e.g., communications links 214) to content server 202. The communications links can be any communications links suitable for communicating data among user devices 206 and content server 202 such as network links, dial-up links, wireless links, hard-wired links, any other suitable communications links, or any suitable combination of such links.

User devices 206 can include any one or more user devices suitable for requesting video content, presenting a user interface that presents information related to sound recordings embedded in the video content, and/or for performing any other suitable functions. For example, in some embodiments, user devices 206 can include a mobile device, such as a mobile phone, a tablet computer, a wearable computer, a laptop computer, a virtual reality headset, a vehicle (e.g., a car, a boat, an airplane, or any other suitable vehicle) information or entertainment system, and/or any other suitable mobile device and/or any suitable non-mobile device (e.g., a desktop computer, a game console, and/or any other suitable non-mobile device). As another example, in some embodiments, user devices 206 can include a media playback device, such as a television, a projector device, a game console, desktop computer, and/or any other suitable non-mobile device.

Although content server 202 is illustrated as one device, the functions performed by content server 202 can be performed using any suitable number of devices in some embodiments. For example, in some embodiments, multiple devices can be used to implement the functions performed by content server 202.

Although two user devices 208 and 210 are shown in FIG. 2 to avoid over-complicating the figure, any suitable number of user devices, and/or any suitable types of user devices, can be used in some embodiments.

Figure 3:
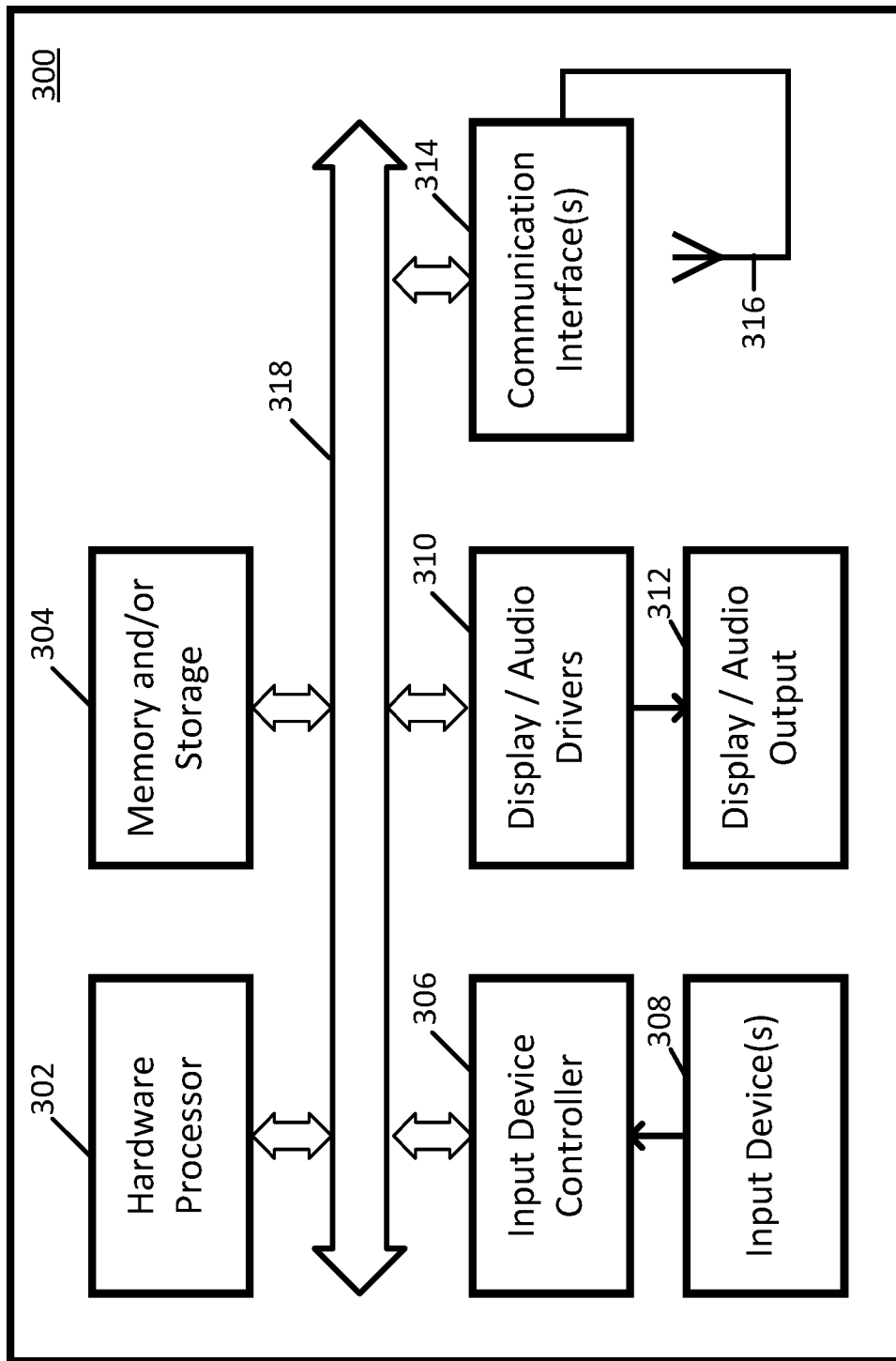
FIG. 3 shows a detailed example of hardware that can be used in a server and/or a user device of FIG. 2 in accordance with some embodiments of the disclosed subject matter.

Content server 202 and user devices 206 can be implemented using any suitable hardware in some embodiments. For example, in some embodiments, devices 202 and 206 can be implemented using any suitable general purpose computer or special purpose computer. For example, a mobile phone may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as content server 202). For example, in some embodiments, the server program can cause hardware processor 302 to transmit a video content item to user device 206, transmit instructions for presenting information related to a sound recording embedded in the video content item, and/or performing any other suitable actions. In some embodiments, hardware processor 302 can be controlled by a computer program stored in memory and/or storage 304 of user device 206. For example, the computer program can cause hardware processor 302 to present a user interface for presenting a video content item and information related to sound recordings embedded in the video content item, and/or perform any other suitable actions.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
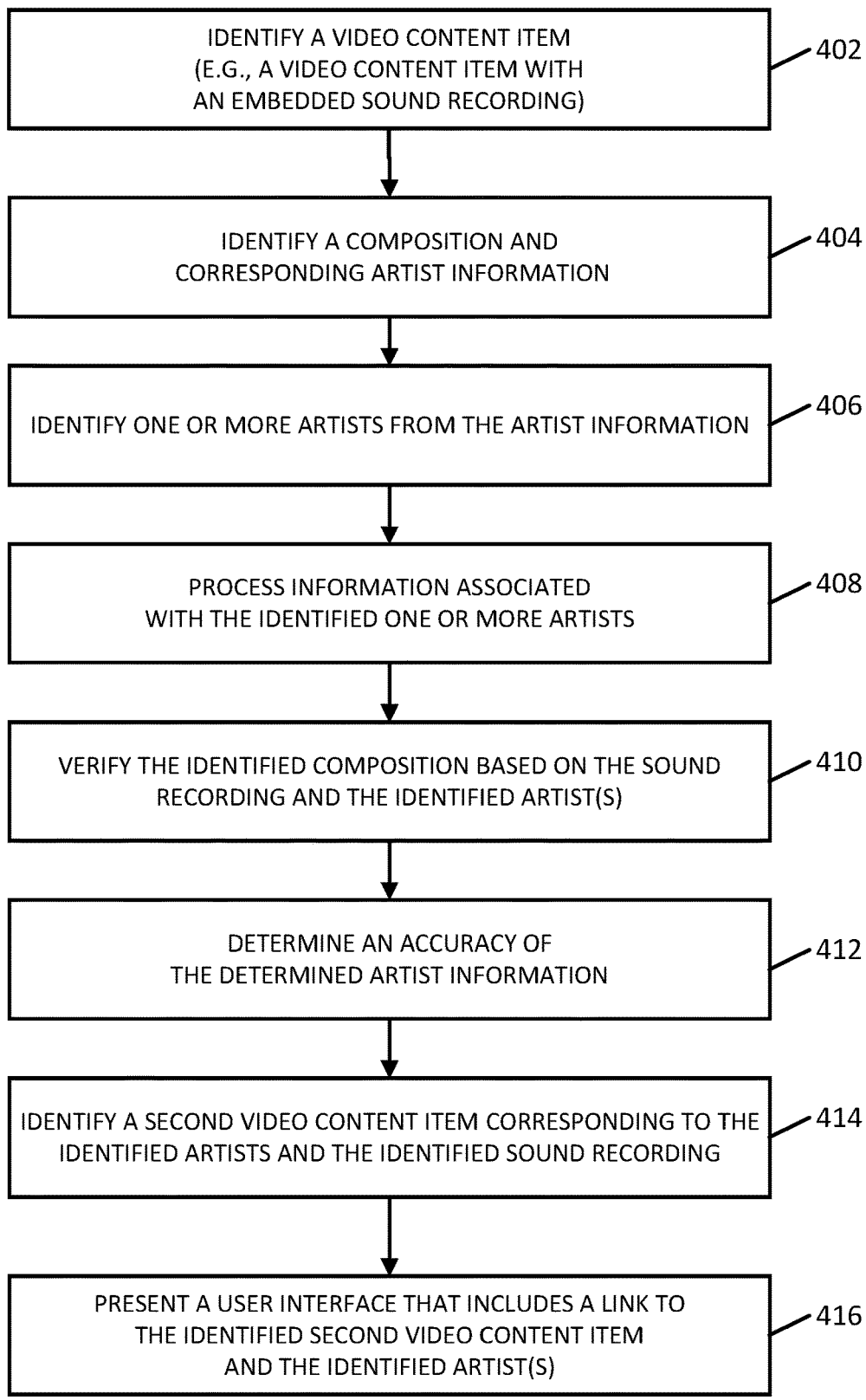
FIG. 4 shows an example of a process for determining and presenting information related to embedded sound recordings in accordance with some embodiments of the disclosed subject matter.

Turning to FIG. 4, an example 400 of a process for providing information associated with sound recordings embedded in video content is shown in accordance with some embodiments of the disclosed subject matter. In some embodiments, blocks of process 400 can be executed by any suitable device, such as content server 202 and/or user device 206, as shown in and described above in connection with FIG. 2.

Process 400 can begin at 402 by identifying a video content item. In some embodiments, the video content item can be a video content item with one or more embedded sound recordings. For example, in some embodiments, the video content item can be a compilation of music videos, a video with a soundtrack, a movie with a soundtrack, a television show with a soundtrack, and/or any other suitable type of video content item. In some embodiments, process 400 can identify the video content item using any suitable technique or combination of techniques. For example, in some embodiments, process 400 can identify the video content item by iterating through a group of video content items that include embedded sound recordings (e.g., from a group of video content items that have been recently uploaded to a video sharing service, and/or any other suitable group of video content items). In another example, in some embodiments, process 400 can cluster video content items that include like sound recordings by performing a similarity comparison of fingerprints or other suitable compact representations of video content items.

Process 400 can identify a composition corresponding to the embedded sound recording at 404. For example, in some embodiments, process 400 can identify a name of a song or a name of a musical work corresponding to the sound recording embedded in the video content item. In some embodiments, process 400 can identify the composition using any suitable technique or combination of techniques. For example, in some embodiments, process 400 can identify a composition associated with an audio fingerprint similar to or otherwise matching an audio fingerprint of the sound recording embedded in the video content item. In some such embodiments, process 400 can identify a composition with similar or matching fingerprints to the sound recording by querying any suitable database, and/or using any other suitable source of information. Note that, in instances where the video content item includes multiple sound recordings (e.g., more than one song, and/or any other suitable number of sound recordings), process 400 can identify a group of compositions each corresponding to a sound recording embedded in the video content item. In some embodiments, process 400 can determine any suitable identifiers corresponding to the sound recording and/or the composition. For example, in some embodiments, process 400 can determine an identifier that uniquely identifies the sound recording, such as an International Standard Recording Code (ISRC) identifier corresponding to the sound recording. As another example, in some embodiments, process 400 can determine an identifier corresponding to the composition, such as an International Standard Musical Work Code (ISWC) identifier corresponding to the composition. In some such embodiments, process 400 can determine the identifiers using any suitable source of information, such as a database associated with a video sharing service that provides the video content item, a database associated with an entity other than the video sharing service, and/or based on any other suitable source of information.

In some embodiments, process 400 can additionally receive artist information (e.g., songwriters, singers, band members, a name of a musical group, and/or any other suitable artists) associated with the composition at 404. For example, in some embodiments, information indicating names of songwriters, singers, musical groups, and/or any other artists associated with each composition can be identified based on metadata associated with each composition in the group of candidate compositions. In some embodiments, the artist information can be from any suitable source, such as from an entity that provided a version of the composition to a video sharing service, and/or from any other suitable source. In some embodiments, the artist information can include any suitable information and can be in any suitable format. For example, in some embodiments, the artist information can include first and/or last names of artists associated with each composition. As another example, in some embodiments, the artist information can include stage names of artists associated with each composition. In some embodiments, the artist information can include any suitable combination of information, such as first and last names, stage names, and/or any other suitable information. In some embodiments, the artist information can include an identifier of the artist, such as an International Standard Name Identifier (ISNI) that uniquely identifies the artist.

Note that, in some embodiments, metadata indicating artist information can be provided by multiple entities for a particular composition and extracted from each version of the particular composition for analysis. For example, in some embodiments, multiple content owners can each upload a version of a particular composition to a video sharing service. In some such embodiments, each content owner can provide corresponding metadata indicating song information and/or artist information which is retrieved by process 400 at block 404. In some embodiments, metadata provided by each content owner can vary in any suitable manner. For example, in some embodiments, a first content owner that provides a first version of the composition to the video sharing service can indicate a first name and a last name of a songwriter associated with the composition, whereas a second content owner that provides a second version of the composition to the video sharing service may only indicate a last name of the songwriter. As another example, in some embodiments, a first content owner that provides a first version of the composition to the video sharing service can indicate a full name of a singer and a stage name used by the singer, whereas a second content owner that provides a second version of the composition to the video sharing service may only indicate a last name of the singer. Additionally, in some embodiments, metadata provided by a content owner can include any suitable extraneous information unrelated to artist information. For example, in some embodiments, metadata provided by a content owner may include extraneous characters, information about a publisher of a composition, and/or any other suitable content.

Process 400 can identify one or more artists associated with the composition at 406 based on the artist information received at block 404. In some embodiments, process 400 can use any suitable information and technique(s) to identify the one or more artists associated with the composition. For example, in some embodiments, process 400 can identify the one or more artists associated with the identified composition based on metadata received from content owners that have provided information about the identified composition. As a more particular example, in an instance where multiple entities have provided artist information associated with a particular composition, process 400 can identify common artists included in the metadata provided by the multiple entities and/or a frequency with which a particular artist is included in the metadata provided by the multiple entities. As a specific example, if more than a predetermined percentage of metadata indicates that Writer A is a songwriter for Song A, process 400 can identify Writer A as an artist associated with Song A. As another specific example, if Writer A is the most common artist included in the metadata provided by the one or more content owners, process 400 can identify Writer A as an artist associated with Song A. As another more particular example, in some embodiments, process 400 can identify metadata provided by content owners that is likely to be relatively complete information. As a specific example, in some embodiments, process 400 can identify metadata that includes first and last names for the one or more artists indicated in the metadata. As another specific example, in some embodiments, process 400 can identify metadata that includes the most number of artists (e.g., a name of a songwriter and a name of a singer, rather than just one artist).

In continuing this example, process 400 can determine that a consensus has been attained in response to determining that a particular percentage of metadata indicates a particular artist as an artist associated with a composition. In some embodiments, process 400 can weigh particular metadata extracted from versions of a composition based on user type, such as a higher weight can be applied to metadata extracted from versions of a composition associated with active owner users. It should be noted that any suitable approach for determining that a consensus has been attained can be used (e.g., a similarity measurement of the artist metadata extracted from different uploaded instances of a composition).

In some embodiments, process 400 can identify one or more artists associated with a composition based on collaboration information associated with different pairings or groupings of artists. For example, in an instance where partial information for one or more artists is known for a particular composition, process 400 can uniquely identify the one or more artists based on collaboration information associated with different artists that include the one or more artists. As a more particular example, a particular composition may have corresponding artist information (as described above in connection with block 404) that includes last names for two artists (e.g., "L1" and "L2"). In this example, without first names, process 400 may not have sufficient information about the two artists, for example, to determine a unique ISNI for each artist. Continuing with this example, in some embodiments, process 400 can identify a group of artists that share at least one of the last names with the two artists associated with the composition. As a specific example, process 400 can identify a group of artists such as: [(F1, L1); (F2, L1); (F3, L1); (F4, L2); (F5, L2); and (F6, L2)], where F1, F2, F3, F4, F5, and F6 are first names for each artist in the group of artists, respectively. In some embodiments, process 400 can determine the first names of the two artists associated with the composition based on collaboration metrics between the artists in the group of artists. For example, process 400 can determine a number of compositions on which an artist with a last name of "L1" from the group of artists has collaborated with an artist with a last name of "L2" from the group of artists, and can identify the first names of the two artists as the first names of the two artists with the largest collaboration metric. As a more particular example, in some embodiments, process 400 can create a collaboration matrix such as:

| Writer 1 | Writer 2 | Number of Collaborations |
|---|---|---|
| (F1, L1) | (F4, L2) | 152 |
| (F1, L1) | (F5, L2) | 1 |
| (F1, L1) | (F6, L2) | 0 |
| (F4, L2) | (F2, L1) | 1 |
| (F4, L2) | (F3, L1) | 0 |

It should be noted that, in some embodiments, mirror relationships can be removed from the collaboration matrix. For example, if Writer 1 is (F1, L1) and Writer 2 is (F4, L2), process 400 can remove a mirror relationship, such as instances where Writer 1 is (F4, L2) and Writer 2 is (F1, L1).

Continuing with this example, process 400 can determine that the number of collaborations is greatest for the pairing of artist (F1, L1) and artist (F4, L2). Therefore, process 400 can determine that the full name of the first artist associated with the composition is "F1 L1" and the full name of the second artists associated with the composition is "F4 L2." In some embodiments, process 400 can then determine an ISNI associated with each of the first artist and the second artist.

Note that, the above example and collaboration matrix is merely illustrative. In some embodiments, process 400 can use any suitable more generalized technique to identify artist information. For example, in some embodiments, process 400 can construct any suitable graph (e.g., a weighted undirected graph, and/or any other suitable type of graph) that indicates collaborations between different artists. In some embodiments, any suitable graph proximity techniques can be used to identify artist information. For example, in some embodiments, process 400 can calculate a Euclidean distance between nodes of a graph indicating collaboration relationships. As a more particular example, in some embodiments, process 400 can embed a graph indicating collaboration relationships on any suitable surface to determine a Euclidean distance between nodes of the graph. Additionally, note that, in some embodiments, process 400 can use any suitable collaboration relationships to identify artist information. For example, in some embodiments, process 400 can use first degree relationships that indicate artists who have directly collaborated with each other. As another example, in some embodiments, process 400 can use any other suitable level of relationship (e.g., second degree, third degree, etc.) indicating artists who have indirectly collaborated (e.g., two artists who share an artist they have each collaborated with, and/or any other suitable type of indirect collaboration).

In some embodiments, process 400 can additionally determine a confidence level associated with the identification of each of the two artists associated with the composition based on any suitable information, such as the number of collaborations associated with each pairing, a difference between the number of collaborations between different pairings, and/or any other suitable information. For example, in some embodiments, the confidence level can be based on a difference between a maximum number of collaborations indicated in the collaboration matrix (e.g., 152 collaborations in the example shown above) and a next highest number of collaborations indicated in the collaboration matrix (e.g., one collaboration in the example shown above). Note that, in some embodiments, the confidence level can be determined using any more generalized graph proximity techniques to determine a strength of a relationship between two nodes of a graph representing collaborations between artists. In some such embodiments, the confidence level can additionally be determined based on any suitable indirect collaboration relationships (e.g., second degree, third degree, etc.) indicating, for example, two artists who share a common collaborator.

Note that, in some embodiments, a collaboration matrix (as shown above) can have any suitable number of pairings of artists. For example, in some embodiments, the collaboration matrix can have an entry for every pairwise possibility of an artist with a last name of L1 with an artist with a last name of L2. That is, while the collaboration matrix shown above has only 6 entries, in some embodiments, process 400 can construct a collaboration matrix with as many as 18 entries using the group of six artists given in the example above. Additionally, note that, although the collaboration matrix shown above indicates a first entry for artist (F1, L1) collaborating with artist (F4, L2) and a second entry for artist (F4, L2) collaborating with artist (F1, L1), in some embodiments, the collaboration matrix can include just one entry indicating a collaboration relationship between two artists.

Note that, although the above describes a technique for uniquely identifying an artist based on partial artist information and collaboration information by constructing a collaboration matrix, this is merely given as an example. In some embodiments, process 400 can use any suitable machine learning or optimization techniques to identify an artist based on partial artist information and collaboration information using any suitable training data. For example, in some embodiments, process 400 can construct a training set of collaboration metrics for different pairings of artists based on a unique identifier assigned to artist names (e.g., numerical representation of artist names, and/or any other suitable representation), and can identify missing artist information based on the training set, as described in more detail below. As a more particular example, each name of an artist (e.g., first name, last name, and/or any other suitable name) can be represented by any suitable character (e.g., an integer, an alphanumeric character, and/or any other suitable representation). As a specific example, first name "F1" can be represented by 1, last name "L1" can be represented by 2, etc. In some embodiments, process 400 can create a vector that represents a full name of an artist, such as each artist in the group of artists described above. For example, in some embodiments, an artist with a full name of "F1 L1" can be represented as [1, 2]. In some embodiments, process 400 can then use the vectors to create a representation of a collaboration metric of a pairing of two artists. For example, in some embodiments, process 400 can create a vector that represents a collaboration of two artists. As a more particular example, a vector representing a collaboration between an artist represented by the vector [1, 2] and an artist represented by the vector [3, 4], where there are 152 collaborations between the two artists can be indicated as: [[1, 2], [3, 4], 152]. In some embodiments, process 400 can then use tensors constructed over any suitable training corpus to uniquely identify artists. For example, in an instance where first names of two artists associated with a composition is unknown (as in the example described above), and where the last names of the two artists are known to be represented by the integers 2 and 4, respectively, process 400 can use the training data to solve an optimization such as: [?, 2], [?, 4], max], where max is a maximum number of collaborations. In some embodiments, process 400 can use any suitable machine learning techniques to identify the two first names corresponding to the two artists and/or the maximum number of collaborations using the training corpus.

Note that, in some embodiments, process 400 can perform any suitable pre-processing on the metadata indicating artist information prior to identifying the one or more artists. For example, in some embodiments, process 400 can remove any suitable information from the artist information included in the metadata that is not likely to be part of an artist name. As a more particular example, in some embodiments, process 400 can remove any suitable characters not likely to be part of a name, such as "(," ")," "[," "]," and/or any other suitable characters. As another more particular example, in some embodiments, process 400 can remove words or terms likely to be part of other information associated with the composition (e.g., a publisher, a song title, etc.). As a specific example, in some embodiments, process 400 can identify words or terms associated with a name of a particular publisher that are included in the artist information, and can remove the words or terms associated with the name of the particular publisher. As another specific example, in some embodiments, process 400 can identify words or terms unlikely to be names (e.g., "song," "track," etc.), and can remove the identified words and terms from the artist information metadata. As another example, in some embodiments, process 400 can determine that the metadata indicating the artist information contains multiple names (e.g., names of multiple musical group members, names of multiple songwriters, a name of a writer and a name of a singer, and/or any other suitable names), and can split the names into multiple fields. As yet another example, in some embodiments, process 400 can convert artist name information indicated in the metadata into any suitable format to facilitate name matching, such as converting all names to uppercase, to lowercase, and/or into any other suitable format.

In some embodiments, process 400 can use any suitable techniques or information to pre-process the metadata. For example, in some embodiments, process 400 can use any suitable databases to identify words or terms associated with particular publishes and/or words or terms unlikely to be part of a name. As a more particular example, in some embodiments, process 400 can use any suitable type of semantic database that indicates relationships between different words, terms, or entities. As another example, in some embodiments, process 400 can use transliteration to convert any suitable portion of the metadata from a first language to a second language.

Process 400 can process information associated with the identified one or more artists associated with the composition at 408. For example, in some embodiments, process 400 can process information associated with the identified one or more artists to format names of the one or more artists into a standard format. As a more particular example, in some embodiments, process 400 can translate the names of the one or more artists into a common format, such as "FirstName LastName," "LastName, Initial," and/or any other suitable format. As another example, in some embodiments, process 400 can process information associated with the one or more artists to determine stage names associated with any of the one or more artists. Process 400 can process the artist name information to determine an artist name in a presentation suitable for presentation using any suitable technique or combination of techniques. For example, in some embodiments, process 400 can query a database (e.g., the ISNI, database, and/or any other suitable database) to determine a name preferred by and/or professionally used by the artist. As another example, in some embodiments, process 400 can format artist names using a common standard, such as using a first name and a last name, and/or any other suitable common format. In some embodiments, process 400 can additionally determine an identifier corresponding to each artist, such as an ISNI identifier, and/or any other suitable identifier.

Process 400 can verify the identified composition based on the identified artist(s) and an identifier corresponding to the sound recording at 410. For example, in some embodiments, process 400 can verify that the identified composition is associated with the sound recording embedded in the video content item by querying a database (e.g., using an ISWC identifier corresponding to the identified composition and an ISRC identifier corresponding to the sound recording). As another example, in some embodiments, process 400 can verify that the identified artist(s) are associated with the identified composition and/or the sound recording by querying a database (e.g., using an ISNI identifier associated with each artist, an ISWC identifier corresponding to the identified composition, and/or an ISRC identifier corresponding to the sound recording). As another example, in some embodiments, process 400 can determine a composition most frequently linked to by content owners providing versions of the sound recording embedded in the video content item. As a more particular example, in some embodiments, process 400 can determine a most frequent ISWC identifier associated with a particular ISRC identifier corresponding to the sound recording embedded in the video content item to determine that the identified composition corresponds to the ISWC identifier most frequently associated with the particular ISRC identifier.

Process 400 can determine a confidence level of the determined artist information at 412. For example, in some embodiments, process 400 can estimate a confidence level of the determined artist information that can be used to determine whether the artist information is to be presented to users. As a more particular example, in some embodiments, process 400 can assign a confidence level to the determined artist information, such as high confidence, medium confidence, low confidence, etc. In some embodiments, process 400 can determine the confidence level using any suitable information and/or techniques. For example, in some embodiments, process 400 can determine the confidence level based on whether or not all artists associated with the composition were verified using any suitable database (e.g., the ISNI database, and/or any other suitable database). As a more particular example, in instances where all artists associated with the composition have a verified ISNI identifier, process 400 can assign a high confidence level to the artist information. As another more particular example, in instances where some artists associated with the composition have a verified ISNI identifier (e.g., more than 70%, more than 80%, and/or any other suitable fraction), process 400 can assign a medium confidence level to the artist information. As yet another more particular example, in instances where at least one artist in a group of artists associated with the composition could not be uniquely identified (e.g., in instances where only a first name of the artist was identified, and/or in any other suitable situation), process 400 can assign a low confidence level to the artist information. As another example, in some embodiments, process 400 can determine the confidence level based on a match score of the identified artist(s) with the composition and/or the sound recording. As a more particular example, in instances where more than a predetermined percentage of artists in a group of identified artists (e.g., more than 90%, more than 95%, and/or any other suitable percentage) are associated with the composition and/or the sound recording (e.g., based on querying a database using ISNI identifiers, ISWC identifiers, and/or ISRC identifiers, and/or using any other suitable information), process 400 can assign a high confidence level to the artist information.

Alternatively, in some embodiments, process 400 can determine a confidence level of the determined artist information in which the confidence level can be used to determine whether features associated with the artist information are to be presented to users. For example, in instances where at least one artist in a group of artists associated with a composition could not be uniquely identified (e.g., in instances where only a first name of the artist was identified, and/or in any other suitable situation), process 400 can assign a low confidence level to the artist information. In continuing this example, features, such as hyperlinks or supplemental information relating to the artist, can be disabled or otherwise inhibited from being presented until a particular confidence level is achieved (e.g., a high confidence level).

In some embodiments, process 400 can identify a second video content item corresponding to the identified sound recording and/or composition that is associated with the identified artist(s) at 414. For example, in instances where the identified composition is Song A performed by Artist B, and where process 400 identified a particular sound recording associated with Song A performed by Artist B (e.g., a particular in-studio recording, a particular live concert performance, and/or any other suitable recording), process 400 can identify a second video content item that corresponds to the particular sound recording of Song A performed by Artist B. In some embodiments, process 400 can identify the second video content item using any suitable technique or combination of techniques. For example, in some embodiments, process 400 can query a database associated with a video sharing service to identify a link to the particular sound recording. Note that, in some embodiments, process 400 can identify the second video content item using any other suitable information. For example, in some embodiments, process 400 can identify a second video content item provided by a particular content owner (e.g., a content owner that has paid to have content items provided more prominently, and/or any other suitable content owner). As another example, in some embodiments, process 400 can identify a second video content item that is a premium content item (e.g., that requires payment to view, etc.).

Note that, in some embodiments, process 400 can store the information determined in blocks 408-414 for future use. For example, in some embodiments, process 400 can store names of artists associated with a particular sound recording in association with an identifier of the sound recording (e.g., in connection with an ISRC identifier associated with the sound recording, and/or any other suitable type of identifier). As another example, in some embodiments, process 400 can store a link to a sound recording most likely to be associated with a particular composition and artist in association with the name of the composition and the artist. As yet another example, in some embodiments, process 400 can store an identifier of the second video content item identified at block 414 in association with an identifier of a particular composition and/or an identifier of a particular sound recording.

At 416, process 400 can cause a user interface that includes a link to the identified second video content item and the determined composition and artist information to be presented on a user device. For example, in some embodiments, process 400 can cause a user interface similar to the user interface shown in and described above in connection with FIG. 1 to be presented on the user device. In some embodiments, process 400 can cause the user interface to be presented on the user device in response to receiving a request for the video content item. For example, in instances where a user of the user device selects a particular video content item, process 400 can cause a user interface in which the requested video content item is presented (e.g., in a video player window, and/or in any other suitable manner) in a first portion of the user interface, and in which song and artist information for sound recordings embedded in the video content item is presented in a second portion of the user interface, as shown in and described above in connection with FIG. 1. In some such embodiments, as described above in connection with FIG. 1, the link to the second video content item can be included in the user interface in any suitable manner. For example, in some embodiments, a song name presented in the user interface can be linked to the second video content item identified at block 414 such that if a user of the user interface selects the song name, the user device navigates to a page associated with the second video content item to present the second video content item on the user device.

Note that, in some embodiments, process 400 can initially inhibit presentation of song information and/or artist information within the user interface presenting the video content item. For example, in some embodiments, process 400 can cause a user interface presenting the video content item to be presented on the user device, and the user interface can include a link that, when selected, causes song information and/or artist information to be presented in a second portion of the user interface (e.g., a "show more" link, and/or any other suitable type of link). Additionally, note that, in some embodiments, as described above in connection with FIG. 1, the user interface can include any other suitable content, such as a suggestion that a user upgrade a subscription to a video sharing service associated with the presented video content item (e.g., to a subscription that provides content without advertisements, and/or any other suitable type of upgrade). In some such embodiments, process 400 can determine the additional content that is to be provided on the user interface based on user account information, such as a user account authenticated on the user device presenting the user interface through which a user associated with the user account is viewing the video content item. For example, in some embodiments, process 400 can determine a current subscription level associated with the user account, and can suggest that the user upgrade to a next subscription level.

In some embodiments, additionally or alternatively to presenting the determined composition and artist information, process 400 can overwrite or other replace metadata associated with versions of the composition that is inconsistent with the determined composition and artist information.

In some embodiments, at least some of the above described blocks of the process of FIG. 4 can be executed or performed in any order or sequence not limited to the order and sequence shown in and described in connection with the figure. Also, some of the above blocks of FIG. 4 can be executed or performed substantially simultaneously where appropriate or in parallel to reduce latency and processing times. Additionally or alternatively, some of the above described blocks of the process of FIG. 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for providing information related to embedded sound recordings are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for providing information related to embedded sound recordings, the method comprising:
   identifying, at a video sharing service, a first video content item that includes a plurality of embedded sound recordings;
   identifying a composition associated with each of the plurality of embedded sound recordings, wherein each embedded sound recording is a particular version of the composition;
   identifying, for each of the plurality of embedded sound recordings, one or more artists associated with the composition based on a collaboration matrix that represents different pairings of artist metadata associated with the composition across a plurality of video content items, wherein each item of artist metadata is provided by a content owner that has provided a sound recording associated with the composition to the video sharing service and wherein the one or more artists are identified by determining a first pairing of artist metadata having a greater number of collaborations than a second pairing of artist metadata across the plurality of video content items;
   identifying a second video content item associated with each of the plurality of embedded sound recordings based at least in part on the identified one or more artists;
   receiving, from a user device, a request to present the first video content item on the user device; and
   in response to receiving the request, causing the user device to present a user interface for presenting the first video content item in a first portion of the user interface and information related to each of the plurality of embedded sound recordings in a second portion of the user interface, wherein the information related to an embedded sound recording includes indications of the one or more artists and a link to the second video content item.

2. The method of claim 1, wherein the composition associated with the embedded sound recording is identified based on an audio fingerprint associated with the embedded sound recording.

3. The method of claim 1, wherein identifying the one or more artists based on the group of metadata comprises identifying one or more artists that occur most frequently in the group of metadata.

4. The method of claim 1, wherein identifying the one or more artists based on the group of metadata comprises identifying metadata in the group of metadata that include a full name for each artist in the one or more artists.

5. The method of claim 1, further comprising identifying a stage name for at least one artist of the one or more artists, wherein the indications of the one or more artists included in the user interface includes the stage name.

6. The method of claim 1, further comprising formatting an artist name for each artist in the one or more artists to a common format.

7. A system for providing information related to embedded sound recordings, the system comprising:
   a memory; and a hardware processor that, when executing computer-executable instructions stored in the memory, is configured to:

identify, at a video sharing service, a first video content item that includes a plurality of embedded sound recordings;

identify a composition associated with each of the plurality of embedded sound recordings, wherein each embedded sound recording is a particular version of the composition;

identify, for each of the plurality of embedded sound recordings, one or more artists associated with the composition based on a collaboration matrix that represents different pairings of artist metadata associated with the composition across a plurality of video content items, wherein each item of artist metadata is provided by a content owner that has provided a sound recording associated with the composition to the video sharing service and wherein the one or more artists are identified by determining a first pairing of artist metadata having a greater number of collaborations than a second pairing of artist metadata across the plurality of video content items;

identify a second video content item associated with each of the plurality of embedded sound recordings based at least in part on the identified one or more artists;

receive, from a user device, a request to present the first video content item on the user device; and in response to receiving the request, cause the user device to present a user interface for presenting the first video content item in a first portion of the user interface and information related to each of the plurality of embedded sound recordings in a second portion of the user interface, wherein the information related to an embedded sound recording includes indications of the one or more artists and a link to the second video content item.

8. The system of claim 7, wherein the composition associated with the embedded sound recording is identified based on an audio fingerprint associated with the embedded sound recording.

9. The system of claim 7, wherein identifying the one or more artists based on the group of metadata comprises identifying one or more artists that occur most frequently in the group of metadata.

10. The system of claim 7, wherein identifying the one or more artists based on the group of metadata comprises identifying metadata in the group of metadata that include a full name for each artist in the one or more artists.

11. The system of claim 7, wherein the hardware processor is further configured to identify a stage name for at least one artist of the one or more artists, wherein the indications of the one or more artists included in the user interface includes the stage name.

12. The system of claim 7, wherein the hardware processor is further configured to format an artist name for each artist in the one or more artists to a common format.

13. A non-transitory computer-readable medium containing computer-executable instructions that, when executed by a processor, cause the processor to perform a method for providing information related to embedded sound recordings, the method comprising:

identifying, at a video sharing service, a first video content item that includes a plurality of embedded sound recordings;

identifying a composition associated with each of the plurality of embedded sound recordings, wherein each embedded sound recording is a particular version of the composition;

identifying, for each of the plurality of embedded sound recordings, one or more artists associated with the composition based on a collaboration matrix that represents different pairings of artist metadata associated with the composition across a plurality of video content items, wherein each item of artist metadata is provided by a content owner that has provided a sound recording associated with the composition to the video sharing service and wherein the one or more artists are identified by determining a first pairing of artist metadata having a greater number of collaborations than a second pairing of artist metadata across the plurality of video content items;

identifying a second video content item associated with each of the plurality of embedded sound recordings based at least in part on the identified one or more artists;

receiving, from a user device, a request to present the first video content item on the user device; and in response to receiving the request, causing the user device to present a user interface for presenting the first video content item in a first portion of the user interface and information related to each of the plurality of embedded sound recordings in a second portion of the user interface, wherein the information related to an embedded sound recording includes indications of the one or more artists and a link to the second video content item.

14. The non-transitory computer-readable medium of claim 13, wherein the composition associated with the embedded sound recording is identified based on an audio fingerprint associated with the embedded sound recording.

15. The non-transitory computer-readable medium of claim 13, wherein identifying the one or more artists based on the group of metadata comprises identifying one or more artists that occur most frequently in the group of metadata.

16. The non-transitory computer-readable medium of claim 13, wherein identifying the one or more artists based on the group of metadata comprises identifying metadata in the group of metadata that include a full name for each artist in the one or more artists.

17. The non-transitory computer-readable medium of claim 13, wherein the method further comprises identifying a stage name for at least one artist of the one or more artists, wherein the indications of the one or more artists included in the user interface includes the stage name.

18. The non-transitory computer-readable medium of claim 13, wherein the method further comprises formatting an artist name for each artist in the one or more artists to a common format.

* * * * *